United States Patent

Haverlag et al.

[11] Patent Number: 5,883,711
[45] Date of Patent: *Mar. 16, 1999

[54] METHOD AND DEVICE FOR SELECTING LOW-PRESSURE MERCURY DISCHARGE LAMPS

[75] Inventors: Marco Haverlag, Eindhoven; Franciscus J. Van Dam, Roosendaal; Engelbertus C. P. Vossen, Eindhoven, all of Netherlands

[73] Assignee: U.S. Philips Corporation, New York, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 899,947

[22] Filed: Jul. 24, 1997

[30] Foreign Application Priority Data

Jul. 29, 1996 [EP] European Pat. Off. .............. 96202145

[51] Int. Cl.$^6$ .................................................. G01N 21/64
[52] U.S. Cl. ...................... 356/316; 356/317; 250/461.1; 209/578
[58] Field of Search ..................................... 356/317, 318, 356/417, 316; 250/461.1; 209/576, 577, 578

[56] References Cited

U.S. PATENT DOCUMENTS 5,669,510  9/1997  Lauwerijssen et al. ................. 209/578

FOREIGN PATENT DOCUMENTS

3911395C1  5/1990  Germany ......................... B09B 3/00
4401351  7/1995  Germany.

Primary Examiner—F. L. Evans
Attorney, Agent, or Firm—F. Brice Faller

[57] ABSTRACT

The invention relates to a method of selecting low-pressure mercury discharge lamps each provided with a discharge vessel which supports a luminescent layer on an inner surface, by which method the luminescent layer is excited and the low-pressure mercury discharge lamps are selected in dependence on the emission spectrum of the light radiated by the luminescent layer. The invention also relates to a device for selecting low-pressure mercury discharge lamps which are each provided with a discharge vessel supporting a luminescent layer on an inner surface, which device is provided with an excitation source for exciting the luminescent layers of the low-pressure mercury discharge lamps to be selected and with detection means for detecting the light radiated by the low-pressure mercury discharge lamps to be selected. According to the invention, the selection process comprises at least one step in which it is determined from previously defined portions of the emission spectrum whether or not the luminescent layer contains a given luminescent material. It was found to be possible by means of this selection criterion to subdivide the luminescent layers into a small number of groups, each group being capable of recycling in a simple manner and with a high yield.

13 Claims, 2 Drawing Sheets

METHOD AND DEVICE FOR SELECTING LOW-PRESSURE MERCURY DISCHARGE LAMPS

BACKGROUND OF THE INVENTION

The invention relates to a method of selecting discharge lamps which are each provided with a discharge vessel which supports a luminescent layer at an inner surface, by which method the luminescent layer is excited by means of ultraviolet radiation generated inside the lamp vessel, and the discharge lamps are selected in dependence on the emission spectrum of the light radiated by the luminescent layer. The invention also relates to a device for selecting discharge lamps which are each provided with a discharge vessel which supports a luminescent layer on an inner surface, which device is provided with an excitation source for generating ultraviolet radiation within the lamp vessel and thus exciting the luminescent layer of each of the discharge lamps to be selected and is provided with detection means for detecting the light radiated by the low-pressure mercury discharge lamps to be selected.

A method as mentioned in the opening paragraph is known from German Patent document DE 3911395 C1. Such a method often forms part of a process for recycling low-pressure mercury discharge lamps. Such a process often comprises a process step in which the luminescent layer of the low-pressure mercury discharge lamp (also referred to as "lamp" hereinafter) is removed from the lamp vessel and collected so as to be made suitable for re-use by means of a number of further process steps, or to serve as a basic material for the chemical industry. Widely differing mixtures of luminescent materials, however, are used in the luminescent layers of low-pressure mercury discharge lamps. A mixture of luminescent layers of widely differing compositions is not suitable for re-use. The further process steps for making the materials suitable for re-use, moreover, are not the same for each and every luminescent layer composition. It is often not possible for these reasons to prepare luminescent layer materials jointly for re-use if they originate from low-pressure discharge lamps of different types and made by different manufacturers. A separate recycling of each individual luminescent layer composition, however, would lead to a highly complicated recycling process. This is why it is desirable to achieve a separation into a limited number of groups in the collection of the luminescent layer materials, each group being capable of preparation for re-use by means of its own distinct process steps. It is required for this that the composition of the recycled mixture yielded by recycling of a certain group can be rendered suitable for use in various types of low-pressure mercury discharge lamps in a simple manner, for example through the addition of one or several luminescent substances. The fact that each composition of a luminescent layer of a low-pressure mercury discharge lamp corresponds to a distinct, individual emission spectrum renders it possible to identify this composition through measurement of the emission spectrum of the low-pressure mercury discharge lamp. The excitation of the luminescent layer necessary for this may be realized, for example, by igniting the low-pressure mercury discharge lamp. It is also possible to excite the luminescent layer by inducing a discharge locally in the plasma of the low-pressure 10 mercury discharge lamp by means of an external electric field. If the lamp is leaky, for example, and the composition of the gas filling has been so changed thereby that it is no longer possible to generate a discharge in this gas filling, it is possible to introduce a UV source into the lamp vessel after the latter has been opened at one end and to realize the excitation in this manner. It is possible in principle to derive the composition of the luminescent layer of the low-pressure mercury discharge lamp from the emission spectrum.

SUMMARY OF THE INVENTION

The invention has for its object to provide a method and a device for selecting discharge lamps, more in particular low-pressure mercury discharge lamps, whereby it is possible to subdivide the luminescent layers of these lamps into a comparatively small number of groups on the basis of comparatively simple selection criteria, such that at least a major portion of the luminescent materials can be efficiently re-used.

According to the invention, it is concluded from previously defined portions of the emission spectrum whether or not the luminescent layer comprises a given luminescent material.

Similarly, the detection means comprise means for concluding from previously defined portions of the emission spectrum whether or not the luminescent layer comprises a given luminescent material.

It was found to be possible to subdivide the luminescent layers of the lamps to be selected into two or more groups, in dependence on the compositions of these luminescent layers, through a verification of whether one or several given luminescent substances are present in the relevant layer. A subdivision of the luminescent layer materials into these groups was found to make it possible to recycle a major portion of the luminescent materials in a comparatively simple manner.

It was also found that it is possible in many cases to derive in a comparatively simple manner whether or not the luminescent layer comprises a given luminescent substance from the ratio of the intensities of the emitted radiation in the previously defined portions of the emission spectrum.

Good results are achieved with batches of lamps to be selected with luminescent layers having widely differing compositions when it is determined from the emission spectrum whether the luminescent layer comprises one or several of the following luminescent materials:

yttrium oxide activated by trivalent europium,
cerium-magnesium pentaborate activated by gadolinium and terbium, and
halophosphate.

A major proportion of the low-pressure mercury discharge lamps to be selected is of the so-called three-band type. This means that the luminescent layer comprises mainly three luminescent substances each having an emission mainly in a comparatively narrow range of the visible spectrum. In general, the luminescent layer of such a low-pressure mercury discharge lamp comprises a red-luminescing material, a blue-luminescing material, and a green-luminescing material. Yttrium oxide activated by trivalent europium (referred to as YOX below) is practically always used as the red-luminescing material. The presence of YOX in the luminescent layer forms a strong indication that the lamp is a low-pressure mercury discharge lamp of the three-band type.

The green-luminescing material used in low-pressure mercury discharge lamps of the three-band type is often cerium-magnesium pentaborate activated by gadolinium and terbium (referred to as CBT below). If YOX is present in the luminescent layer, it is verified whether the luminescent layer comprises CBT. If this is the case, it has been ascertained that the luminescent layer of the low-pressure mercury discharge lamp comprises at least a first luminescent sub-layer containing both YOX and CBT. A considerable fraction of such lamps, however, is provided with a second luminescent sub-layer comprising halophosphate. A verification of whether the luminescent layer comprises halophosphate renders it possible to separate luminescent layers comprising both YOX and CBT into two groups. The first group is formed by luminescent layers not comprising halophosphate and the second group by luminescent layers comprising halophosphate. Luminescent layers not comprising YOX but comprising halophosphate belong to a third group. The luminescent layers belonging to this third group usually comprise halophosphate only. Luminescent layers which do comprise YOX but no CBT form a fourth group. This fourth group mainly comprises luminescent layers of lamps of the three-band type in which the green-luminescent layer is different from CBT. All luminescent layers not belonging to one of the first four groups belong to a residual group: the fifth group. The same subdivision into five groups may be achieved in that the three selection criteria are applied in an order different from the one described above. It was found that the separate recycling of the luminescent layer materials of the lamps belonging to the first four of these five groups renders possible a comparatively simple and highly efficient recycling process. The fifth group is not recycled and constitutes chemical waste.

It was found to be advantageous when the selection process comprises a step in which it is derived from the emission spectrum whether or not the luminescent layer of the low-pressure mercury discharge lamp contains a green-luminescing material. Depending on the origin of the lamps to be selected, the luminescent layers of these lamps may comprise YOX while nevertheless the lamps are not of the three-band type. The luminescent layer of such lamps may comprise, for example, a mixture of YOX and halophosphate. A verification of whether the luminescent layers of lamps comprising YOX also comprise a green-luminescing material renders it possible to distinguish such luminescent layers from luminescent layers which are indeed of the three-band type, so that they can be collected in the fifth group. Such luminescent layers would be collected in the fourth group if the selection criterion of whether or not the luminescent layer comprises a green-luminescing material were not applied. It was found in those cases where a comparatively large fraction of the lamps to be selected comprised a mixture of YOX and halophosphate in the luminescent layers that the quality of the recycled luminescent layer material in the fourth group improved as a result of this additional selection criterion. It is also possible in principle to derive from the emission spectrum whether the luminescent layer comprises a blue-luminescing substance and to conclude therefrom whether or not the lamp is of the three-band type. This criterion, however, is less reliable in practice because there are lamps of the three-band type whose luminescent layers do not comprise a blue-luminescent substance. A green-luminescing substance, on the other hand, is present in the luminescent layers of all lamps of the three-band type.

Depending on the origin of the lamps to be selected, it was also found to be advantageous when the selection process comprises a step in which it is derived from the emission spectrum whether or not the luminescent layer of the low-pressure mercury discharge lamp contains magnesium germanate. Magnesium germanate sometimes forms part of a luminescent layer which does comprise YOX, but no CBT. It was found that magnesium germanate adversely affects the quality of the recycled luminescent layer material of the fourth group. A detection of magnesium germanate renders it possible to assign luminescent layers containing magnesium germanate to the fifth group instead of the fourth group.

If the selection process comprises a step in which it is derived from the emission spectrum whether or not the light emitted by the low-pressure mercury discharge lamp is white, it is possible to collect the luminescent layers of lamps not designed for general lighting purposes in the residual group. The dispersion in the compositions of the luminescent layers in at least part of the first four groups is thus less wide because the luminescent layers in the first four groups will comprise exclusively mixtures of luminescent materials which generate white light upon excitation. The quality of the yield of the recycling process is improved thereby, also in dependence on the origin of the lamps to be selected.

If the selection process comprises a step in which the total quantity of light emitted by the low-pressure mercury discharge lamp is measured, it is possible to detect leaky lamps whose plasma composition has been so changed that is no longer possible to achieve a discharge in this plasma. The luminescent layer of such a lamp can be excited at least partly by means of long-wave UV radiation through the wall of the lamp vessel. It is possible to demonstrate thereby, for example, whether or not a blue-luminescing substance comprising bivalent europium is present in the luminescent layer. If this is the case, the lamp is probably of the three-band type, and the luminescent layer can be collected in the fourth group, and if not, in the fifth group. It is also possible, as stated above, to excite the luminescent layers of such lamps by bringing a UV source into the lamp vessel after the latter has been opened at one end.

DESCRIPTION OF THE PREFERRED EMBODIMENTS

Figure 1:
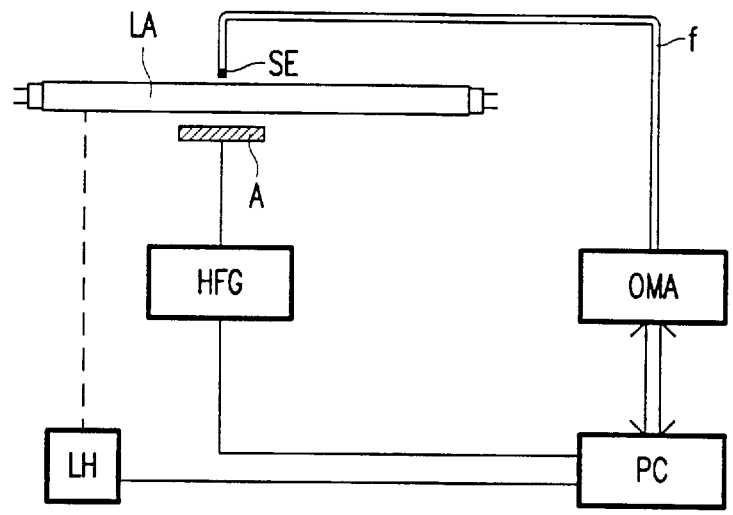
FIG. 1 is a diagram of an embodiment of a device according to the invention.

In FIG. 1, La is a low-pressure mercury discharge lamp to be selected, provided with a glass lamp vessel and a luminescent layer. A is an antenna which is positioned in the immediate vicinity of the lamp. The antenna A is coupled to a generator HFG for generating a high-frequency electric signal. PC is a computer for controlling the selection process carried out by the device. A first output of computer PC is for this purpose coupled to an input of generator HFG. Computer PC is also coupled to analysis unit OMA for measuring the intensity of the light radiated by the lamp La within one or several wavelength ranges. To achieve this, an input of analysis unit OMA is connected via an optical fiber f to a sensor SE arranged in the vicinity of the lamp La. Computer PC is further coupled to means LH for manipulating the lamp La. The means LH are for this purpose coupled to the lamp La. This coupling is indicated with a broken line in FIG. 1.

The operation of the device shown in FIG. 1 is as follows.

The generator HFG generates a high-frequency electric signal during operation of the device. This high-frequency electric signal triggers a discharge in the plasma of the lamp by means of the antenna A. This discharge locally excites the luminescent layer of the lamp La, so that this luminescent layer emits light. This light is caught by the sensor SE, and the analysis unit OMA measures the intensity of this light, received via optical fiber f, in a number of wavelength ranges. The computer PC determines whether the luminescent layer of the lamp contains YOX, CBT and/or halophosphate from, inter alia, the ratios of the intensities in the various wavelength ranges, and accordingly determines to which of the five groups the luminescent layer of the lamp belongs. Subsequently, the ends are removed from the lamp by means not shown in FIG. 1 and the lamp is transported by the means LH to one of five blowing stations, also not shown in FIG. 1. The five blowing stations correspond to the five groups into which the luminescent layers of the lamps are subdivided by means of the selection process. The luminescent layer is removed from the lamp vessel in each of the blowing stations by means of compressed air and is stored in a container.

Alternatively, it is also possible to remove at least one end of the lamp first and bring a UV source inside the lamp vessel to excite the luminescent layer.

Figure 2:
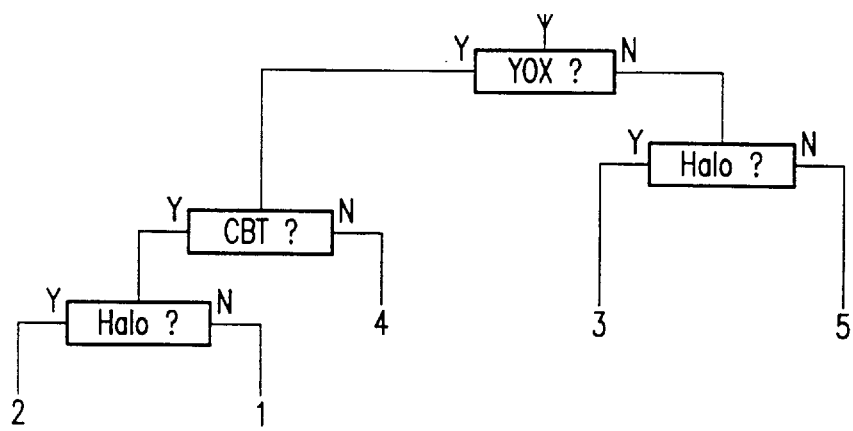
FIG. 2 is a flowchart representing a method according to the invention.

The flowchart representing the method according to the invention as shown in FIG. 2 shows that the first step in the selection process is that it is concluded from the emission spectrum whether or not the luminescent layer comprises YOX. This may be done, for example, by means of the ratio of the intensities of the emitted radiation in the wavelength range from 610.9 nm to 612.1 nm and in the wavelength range from 605.2 nm to 606.4 nm. If the intensity of the radiation in the former first wavelength range is substantially greater than that in the latter second wavelength range, it may be concluded that YOX is present in the luminescent layer. The intensity in the former wavelength range is also compared with the intensity of the 435 nm Hg line for verification. This serves to verify that the radiation in the former wavelength range does not consist exclusively of noise.

If the luminescent layer comprises YOX, it is verified whether the luminescent layer contains CBT through a measurement of whether the emitted intensity drops steeply in the wavelength range from 486.0 nm to 488.7 nm, and at the same time rises steeply in the wavelength range from 488.7 nm to 490 nm. If this is not the case, it is concluded that the luminescent layer does not contain CBT and belongs to the fourth group. If the luminescent layer contains both YOX and CBT, it is verified whether the luminescent layer also contains halophosphate through a measurement of the intensity of the emitted light in the wavelength range from 564.0 nm to 571.0 nm, which is subsequently compared with the 435 nm Hg line. If the intensity in the former wavelength range is greater than that in the latter range, it is concluded that the luminescent layer comprises halophosphate and belongs to the second group. If no halophosphate is demonstrated, it is concluded that the luminescent layer of the lamp belongs to the first group. If it is found that the luminescent layer contains no YOX, it is now determined whether the luminescent layer contains halophosphate through a measurement of the intensities of the emitted light in the wavelength ranges from 564.0 nm to 571.0 nm and from 622.0 nm to 629 nm. If the intensity in the former wavelength range is greater than that in the latter range, it is concluded that the luminescent layer contains halophosphate. The intensity of the emitted light in the wavelength range from 564.0 nm to 571.0 nm is again compared with the 435 nm Hg line so as to verify that the intensity emitted in this wavelength range is not exclusively caused by noise. If the luminescent layer contains halophosphate, it is concluded that the luminescent layer belongs to the third group. If the luminescent layer contains no halophosphate, it is concluded that the luminescent layer belongs to the fifth group.

Figure 3:
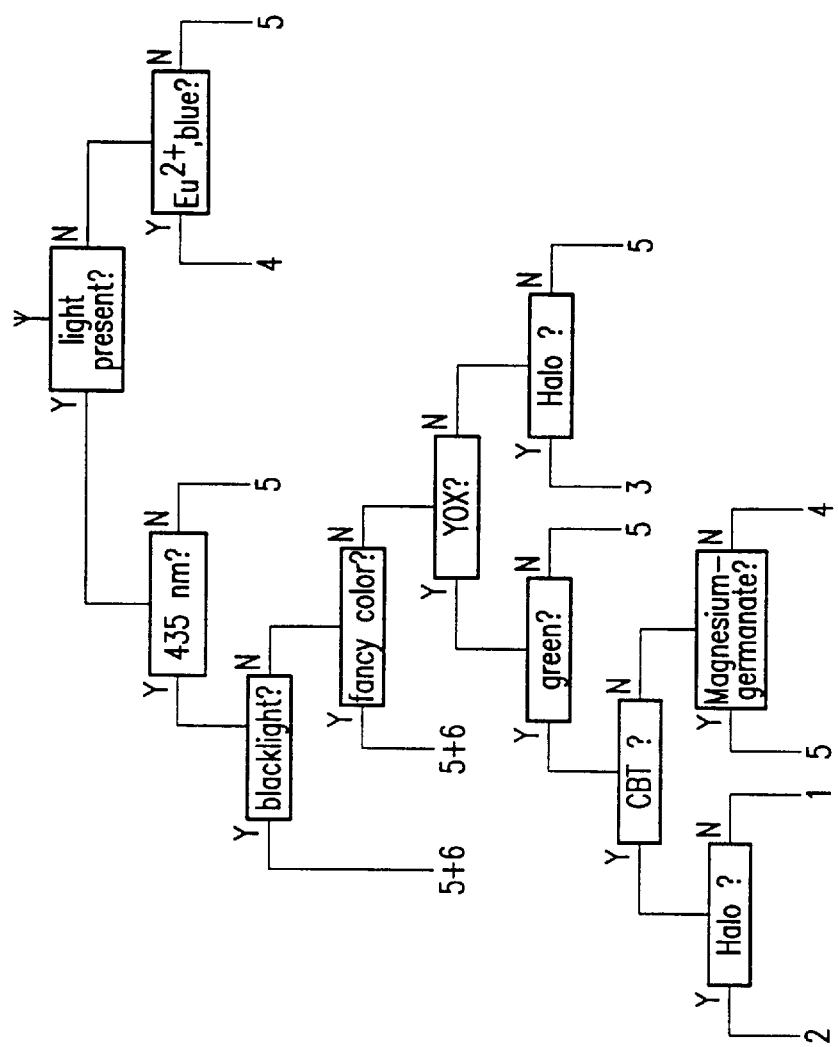
FIG. 3 is a flowchart representing a further method according to the invention.

The flowchart of the method according to the invention shown in FIG. 3 relates to a selection process comprising all steps of the method shown in FIG. 2 plus a number of additional steps. It is measured in the first step of the selection process whether the lamp actually emits light in that the total intensity of the light in the visible spectrum is measured, and it is determined whether this intensity is greater than a reference value. For example, the lamp may have a leak, so that the composition of the filling has been changed to the extent that it is not possible to induce a discharge therein. If it is found that the lamp emits no light, the luminescent layer is excited with long-wave UV radiation through the wall of the lamp vessel. This is done by means not shown in FIG. 1. If a certain amount of emission is measured at 438 nm by means of a p-i-n diode detector with a filter having a width of approximately 5 nm, it is concluded that the luminescent layer comprises a blue-luminescing material activated by bivalent europium, and that the luminescent layer belongs to the fourth group. If the luminescent layer contains no blue-luminescing material activated by bivalent europium, it is concluded that the luminescent layer belongs to the fifth group. An alternative is to remove an end of the lamp vessel in the absence of emitted light, to introduce a UV source into the lamp vessel, and to excite the luminescent layer (locally) thereby, the selection then taking place in the same manner as for lamps not having leaks.

If the lamp emits a sufficient quantity of light, it is verified whether the emission spectrum contains the 435 nm Hg line. If this is not the case, it is concluded that the luminescent layer of the lamp definitely does not belong to one of the first four groups, and that the luminescent layer accordingly belongs to the fifth group. If the emission spectrum does contain the 435 nm Hg line, it is verified whether the lamp is a blacklight-blue lamp. Blacklight-blue lamps emit ultraviolet light which is reflected as visible light by objects such as clothing. Such lamps are used, for example, in discos and the like. If the ratio between the intensity in the wavelength range from 363 nm to 373 nm and the intensity of the 435 nm Hg line is above a reference value, it is concluded that the lamp is a blacklight-blue lamp. The luminescent layer in that case belongs to the fifth group. In practice, a blacklight-blue lamp is often provided with a layer which reflects visible light. It is often desirable to separate such lamp vessels provided with coatings from the other lamp vessels if the lamp vessels of the selected lamps are collected for recycling of the glass. This is indicated with the number 6 in FIG. 3. If the lamp is not a blacklight-blue lamp, it is verified whether the lamp emits visible light having a color different from white (fancy color). It is concluded that the lamp is a non-white (fancy color) lamp if the ratio between the intensity of the light emitted by the lamp over the entire visible spectrum and the intensity of the 435 nm Hg line lies above a reference value. Many non-white lamps have an absorbing layer which absorbs part of the visible spectrum and also the 435 nm Hg line. As a result, the ratio of the intensity of the light emitted by the lamp over the entire visible spectrum to the intensity of the 435 nm Hg line has a higher value than that found for a normal lamp emitting white light. If the lamp is found to be a normal lamp emitting white light, it is verified whether the luminescent layer comprises YOX in the manner as described above with reference to FIG. 2. If the luminescent layer comprises YOX, the lamp is very probably, but not with absolute certainty, a lamp of the three-band type. It is then determined whether the ratio of the emitted intensity in the wavelength range from 484.0 nm to 491.0 nm to the intensity of the 435 nm Hg line is greater than a reference value so as to verify whether the lamp is a lamp of the three-band type. If this is the case, it is determined whether the luminescent layer of the lamp contains a green-luminescing material, and accordingly the lamp is of the three-band type. If the luminescent layer of the lamp does not contain a green-luminescing material, it is concluded that the luminescent layer belongs to the fifth group.

The final selection step in the flowchart shown in FIG. 3, which is different from all selection steps shown in FIG. 2, is the determination whether the luminescent layer comprises magnesium germanate in the case in which it does not comprise CBT. To ascertain this, the difference in intensity is determined between the emission at 657 nm and the emission at 675 nm. If the ratio of this difference to the intensity of the 435 nm Hg line is greater than a reference value, it is concluded that the luminescent layer of the lamp contains magnesium germanate and belongs to the fifth group. If the luminescent layer does not contain magnesium germanate, it is concluded that it belongs to the fourth group. The luminescent layer materials of the first four groups are first divested of mercury, for example through heating in vacuo. The halophosphate may be removed from the luminescent materials of the second group through selective dissolving. The luminescent materials of the first group and the fourth group, as well as those of the second group after removal of halophosphate can be re-used as luminescent layers in lamps of the three-band type. The desired color point of the lamp may be adjusted through the admixture of red-, blue-, and/or green-luminescing materials. Since CBT is a highly efficient green-luminescing material, the lamps whose luminescent layers contain recycled material from the first or second group have a comparatively high luminous efficacy compared with lamps whose luminescent materials contain recycled material from the fourth group. The halophosphates collected in the third group form a good basic material for the chemical industry, for example the fertilizer industry.

It is thus achieved that comparatively simple selection criteria lead to a subdivision of the luminescent layers of discarded low-pressure mercury discharge lamps into a limited number of groups (five in this embodiment). The luminescent materials in the first four of these five groups are efficiently re-used. Only the fifth group constitutes chemical waste.

We claim:

1. A method of determining whether given luminescent materials are present in a luminescent layer on an inner surface of a discharge vessel of a discharge lamp, said method comprising exciting the luminescent layer by means of ultraviolet radiation generated inside the lamp vessel so that the luminescent layer emits radiation, measuring the intensity of radiation emitted by the luminescent layer in at least one first wavelength range and at least one second wavelength range, comparing the intensity of radiation emitted in said at least one first wavelength range with the intensity of light emitted in said at least at least one second wavelength range, and concluding whether or not a given luminescent material is present in said luminescent layer based on said comparing of said intensities in said first and second ranges.

2. Method as in claim 1 wherein said lamp is a low-pressure mercury vapor discharge lamp.

3. A method as in claim 1 wherein it is concluded whether at least one of the following materials is present:

yttrium oxide activated by trivalent europium, cerium-magnesium pentaborate activated by gadolinium and terbium, and halophosphate.

4. A method as in claim 1 wherein it is concluded whether a green luminescing material is present.

5. A method as in claim 1 wherein it is concluded whether magnesium germanate is present.

6. A method as in claim 1 wherein it is concluded whether the radiation emitted is white light.

7. A method as in claim 1 further comprising measuring the total quantity of radiation emitted by the luminescent layer and concluding from this whether a given luminescent material is present.

8. A device for determining whether given luminescent materials are present in a luminescent layer on an inner surface of a discharge vessel of a low-pressure mercury vapor discharge lamp, said device comprising an excitation source for generating ultraviolet radiation within the lamp vessel so that the luminescent layer emits radiation, means for measuring the intensity of radiation emitted by the luminescent layer in at least one first wavelength range and at least one second wavelength range means for comparing the intensity of radiation emitted in said at least one first wavelength range with the intensity of light emitted in said at least one second wavelength range, and means for concluding whether or not a given luminescent material is present in said luminescent layer based on said comparing of said intensities in said first and second ranges.

9. A device as in claim 8 wherein said means for concluding comprises at least one of means for concluding whether yttrium oxide activated by trivalent europium is present in said luminescent layer, means for concluding whether cerium-magnesium pentaborate activated by gadolinium and terbium is present in said luminescent layer, and means for concluding whether halophosphate is present in said luminescent layer.

10. A device as in claim 8 wherein said means for concluding comprises means for concluding whether a green luminescing material is present.

11. A device as in claim 8 wherein said means for concluding comprises means for concluding whether magnesium germanate is present.

12. A device as in claim 8 further comprising means for determining whether said emitted radiation is white light.

13. A device as in claim 8 further comprising means for measuring the total quantity of-radiation emitted by the luminescent layer and concluding from this whether a given luminescent material is present.

* * * * *